UNITED STATES PATENT OFFICE 2,427,527

DYESTUFFS OF THE ANTHRAQUINONE SERIES AND A PROCESS FOR THEIR MANUFACTURE

Ernst Gutzwiller, Basel, Switzerland, assignor to Sandoz Limited, Basel, Switzerland, a firm No Drawing. Application February 8, 1946, Serial No. 646,502. In Switzerland February 12, 1945

8 Claims. (Cl. 260—374)

The present invention relates to new dyestuffs of the anthraquinone series which dye animal and synthetic nitrogen-containing fibres into fast reddish-blue shades, and to a process for their manufacture.

It has been found that new anthraquinone dyestuffs can be obtained by treating anthraquinone compounds of the general formula

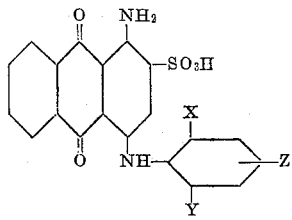

wherein X and Y stand for alkyl groups and Z stands for a substituent selected from the class consisting of hydrogen, alkyl and alkoxy groups, with halogenating agents.

As starting products compounds like 1-amino-4-(2',6'-dimethylphenylamino)-anthraquinone-2-sulphonic acid, 1-amino-4-(2',4',6'-trimethylphenylamino)-anthraquinone-2-sulphonic acid, 1-amino-4-(2',4'-dimethyl-6'-ethylphenylamino)-anthraquinone-2-sulphonic acid, 1-amino-4-(2',3',6'-trimethylphenylamino)-anthraquinone-2-sulphonic acid and similar compounds or salts thereof may be used. The halogenation is preferably carried out in concentrated sulphuric acid, sulphuric acid monohydrate or in diluted fuming sulphuric acid and in presence or absence of compounds facilitating the halogenation like iodine, iron salts and the like. The halogenation is carried out at temperatures between 0–40° C., while, in some cases, it is advantageous to increase, at the end of the reaction, the temperature above 40° C., for instance up to 80° C.

The new dyestuffs obtained in this manner are isolated by pouring the halogenation charge into water or into ice-water and separating the dyestuff in the usual manner. In dry form the new dyestuffs are dark-blue powders which are soluble in water with a blue to reddish-blue coloration. They dye wool, silk, nylon and other synthetic textiles containing nitrogen in brilliant reddish-blue shades possessing excellent fastness properties, especially to washing, to milling and to light.

The new dyestuffs possess an excellent affinity for the fibres and can be dyed from a neutral bath.

The following examples, without being limitative, illustrate the manner in which the invention may be carried out.

Example 1

20 parts of the sodium salt of 1-amino-4-(2',4',6'-trimethylphenylamino)-anthraquinone-2-sulphonic acid are dissolved at 10–25° C. in 120 parts of sulphuric acid monohydrate. While well stirring at 0–30° C., preferably at 10–20° C., 6.9 parts of bromine are added to this solution. After 10–14 hours the temperature is increased for 3 hours up to 60° C. and the reaction mass poured into an ice-water mixture. The precipitated dyestuff is filtered, taken up into an 3% aqueous sodium chloride solution, neutralized, filtered again and dried. The dyestuff thus obtained is a dark-blue powder, dyeing wool in very brilliant reddish-blue shades of excellent fastness properties.

If, instead of the sodium salt of 1-amino-4-(2',4',6'-trimethylphenylamino)-anthraquinone-2-sulphonic acid, a corresponding quantity of the sodium salt of 1-amino-4-(2',6'-dimethyl-4'-methoxyphenylamino)-anthraquinone-2-sulphonic acid is used, a greener dyestuff possessing similar properties will be obtained.

Example 2

18.8 parts of 1-amino-4-(2',4',6-trimethylphenylamino)-anthraquinone-2-sulphonic acid are dissolved at 10–20° C. and with thorough stirring in 90 parts of fuming sulphuric acid containing 2% of SO₃. Then at 0–10° C. 7.5 parts of bromine are added to this solution and the charge is stirred at 10–20° C., until the reaction is complete. The dyestuff thus produced is isolated by pouring the mixture into ice-water and is identical with the dyestuff of Example 1.

If, instead of 1-amino-4-(2',4',6'-trimethylphenylamino)-anthraquinone-2-sulphonic acid, an equivalent quantity of 1-amino-4-(2',4'-di-ethyl-6'-methylphenylamino)-anthraquinon-2-sulphonic acid is used, a similar dyestuff will be obtained.

Example 3

14.6 parts of 1-amino-4-(2',6'-dimethylphenylamino)-anthraquinone-2-sulphonic acid are dissolved at 10–20° C. in 130 parts of 95 to 100% sulphuric acid and treated with good stirring with 6 parts of bromine. The charge is stirred until the reaction is finished, whereby finally the temperature can be increased up to 40–60° C. The dyestuff thus produced is separated by pouring the charge into icewater and by filtration. After neutralisation and drying, a dark-blue powder will be obtained, that dyes wool, silk and other textiles in brilliant reddish-blue shades possessing excellent fastness properties.

Example 4

20 parts of the sodium salt of 1-amino-4-(2',4',6'-trimethylphenylamino)-anthraquinone-2-sulphonic acid are dissolved with thorough stirring at 10–20° C. in 120 parts of fuming sulphuric acid containing 3–4% of SO₃. To this solution are added 0.2 parts of iodine and subsequently 3.4 parts of chlorine are introduced thereinto. The reaction being complete, the charge is worked up in the usual manner. The dyestuff thus obtained dyes wool in very brilliant fast reddish-blue shades. Instead of the fuming sulphuric acid one may also use 95 to 100% sulphuric acid and, in order to increase the rapidity of the halogenation, the temperature can finally be increased for several hours up to 40–70° C. If, instead of the sodium salt of 1-amino-4-(2',4',6'-trimethylphenylamino)-anthraquinone-2-sulphonic acid, the corresponding quantity of the sodium salt of 1-amino-4-(2',6'-dimethylphenylamino)-anthraquinone-2-sulphonic acid is used, a similar dyestuff is obtained which dyes wool in more reddish-shades.

What I claim is:

1. A process for the manufacture of new dyestuffs of the anthraquinone series comprising the step of treating an anthraquinone compound of the general formula

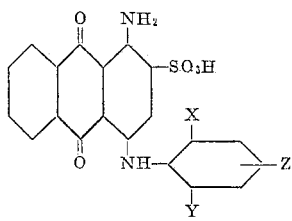

wherein X and Y each stands for a member selected from the group consisting of ethyl and methyl, and Z means a substituent selected from the class consisting of hydrogen, ethyl, methyl and methoxy, with a member selected from the group consisting of chlorinating and brominating agents in a sulphuric acid medium.

2. A process for the manufacture of a new dyestuff of the anthraquinone series comprising the step of treating the anthraquinone compound of the formula

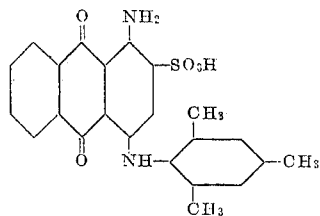

with bromine in a sulphuric acid medium.

3. A process for the manufacture of a new dyestuff of the anthraquinone series comprising the step of treating the anthraquinone compound of the formula

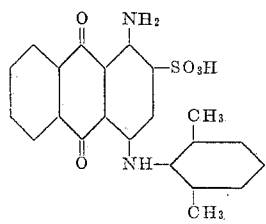

with bromine in a sulphuric acid medium.

4. A process for the manufacture of a new dyestuff of the anthraquinone series comprising the step of treating the anthraquinone compound of the formula

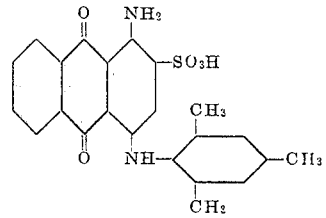

with chlorine in a sulphuric acid medium and in the presence of iodine.

5. The anthraquinone compounds of the general formula

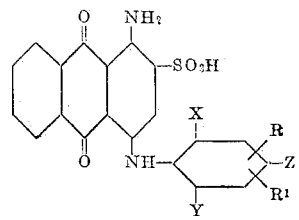

wherein X and Y each stands for a member selected from the group consisting of ethyl and methyl, and Z stands for a substituent selected from the class consisting of hydrogen, ethyl, methyl and methoxy, R is a member of the group consisting of chlorine and bromine, and $R^1$ is a member of the group consisting of hydrogen and bromine, being hydrogen when R is chlorine and being bromine when R is bromine, which compounds, in the dry state, are dark-blue powders being soluble in water with a blue coloration and dyeing animal and synthetic nitrogen-containing fibres into fast brilliant-blue shades.

6. The anthraquinone compound of the formula

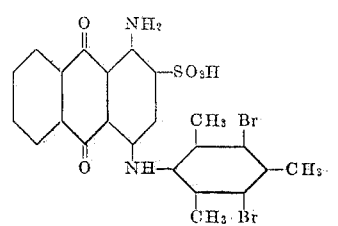

which, in dry state, is a dark-blue powder being soluble in water with a blue coloration and dyeing animal and synthetic nitrogen-containing fibres into fast brilliant-blue shades.

7. The anthraquinone compound of the formula

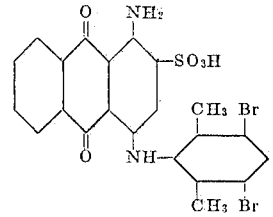

which, in dry state, is a dark blue powder being soluble in water with a blue coloration and dyeing animal and synthetic nitrogen-containing fibres into fast brilliant-blue shades.

8. The anthraquinone compound of the formula

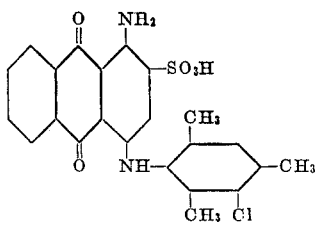

which, in the dry state, is a dark blue powder being soluble in water with a blue coloration and dyeing animal and synthetic nitrogen-containing fibres into fast brilliant-blue shades.

ERNST GUTZWILLER.

REFERENCES CITED

The following references are of record in the file of this patent:

UNITED STATES PATENTS

| Number | Name | Date |
|---|---|---|
| 2,117,569 | Peter | May 17, 1938 |
| 2,121,928 | Peter | June 28, 1938 |
| 2,226,909 | Peter | Dec. 31, 1940 |